Dec. 8, 1936. F. A. FULLER ET AL 2,063,035
ENDLESS TRACK MOUNTING
Filed Aug. 23, 1934 2 Sheets-Sheet 1

Frank A. Fuller
Thomas A. Snyder
INVENTORS

BY Hoar, Ruhloff & Arnaud
ATTORNEYS.

Dec. 8, 1936.  F. A. FULLER ET AL  2,063,035
ENDLESS TRACK MOUNTING
Filed Aug. 23, 1934  2 Sheets-Sheet 2

Frank A. Fuller
Thomas A. Snyder
INVENTORS

BY Hoar, Puhloff + Armand
ATTORNEYS.

Patented Dec. 8, 1936

2,063,035

UNITED STATES PATENT OFFICE 2,063,035

ENDLESS TRACK MOUNTING

Frank A. Fuller, South Milwaukee, and Thomas A. Snyder, Milwaukee, Wis., assignors to Bucyrus-Erie Company, South Milwaukee, Wis., a corporation of Delaware Application August 23, 1934, Serial No. 741,050

5 Claims. (Cl. 305—9)

Our invention relates to new and useful improvements in endless track mountings.

The attempt to mount the relatively smaller sizes of cranes and excavating machinery upon constructions similar to the ordinary farm tractor showed that these constructions were quite inadequate for such purposes.

The wheeled tractor had a rigid under-frame with two axles, each having a wheel at each end. All four wheels could therefore support the device only when they rested upon a plane surface. Upon irregular surfaces, one wheel would be unsupported. Even wrapping an endless tread about the wheels at each side would not make the older construction suitable for the devices contemplated in the present application; for, if an endless belt were wrapped about wheels on a rigid frame, the same difficulty would persist; while, if the forward axle were made tiltable in a transverse vertical plane, such departure from parallelism of the two axles would result in serious warpage of the endless tread belt.

To overcome this difficulty by providing flexibility in a vertical plane for each of the side track-frames, each track-frame was then made independently rotatable about the rear axle; there being, for each track frame, a diagonal brace running from near the center of the rear axle to the forward part of the frame, the purpose of these braces being to prevent the forward ends of the tracks from spreading apart when traveling over irregular ground.

In order to provide a "three-point support" for the machinery or other load to be carried, the forward portion of the load is carried on a bolster, which is pivoted at its middle point to a set of leaf-springs, whose ends rest upon wearing-plates on the track frames. Unevennesses of the surface traversed will cause these leaf-springs to slide on the wearing-plates. In a tractor, which carries on these springs little more than the engine, this difficulty is not serious. But the attempt to mount in this way a superstructure such as is contemplated in this application, carrying a boom for moving relatively heavy loads or for the attachment of excavating devices, would result in such excessive wear of these plates as to cause constant trouble and repairs. Also it is easily seen that, when the two track-frames assume different tilts about the rear axle, the contact between an end of the leaf-springs and the corresponding wear-plate ceases to be a flat-contact and becomes an edge-contact, resulting in still more wear.

Also the uses to which our present invention is to be applied will require the handling of a heavy load at a quite considerable distance off the fore-and-aft center-line of the structure. Thus, for example, if the machine is handling a heavy load to the right of the center line, there will be a tendency of the left end of the leaf-springs to leave contact with its wear-plate. The older constructions contemplated no such upward reactions, and hence would lack sufficient stability for use with heavy side loads.

It is the principal object of our invention to provide a construction that shall be capable of conforming to uneven ground, without excessive wear on any parts, and without the transference into the superstructure of any distortional stresses.

Another object is to provide a construction that shall be stable at all times, even when the superstructure handles large loads at one side of the machine.

In addition to these objects, we have worked out a number of novel and useful details, which will be readily evident as the description progresses.

Our invention consists in the novel parts, and in the combinations and arrangements thereof, which are defined in the appended claims; and of which one embodiment is exemplified in the accompanying drawings, which are hereinafter particularly described and explained.

Throughout the description, the same reference number is applied to the same member or to similar members.

Referring to the drawings, it will be seen that:

Figure 5 is a side elevation, partly in section, of one of the stabilizers of our invention, taken as indicated by the line 5—5 in Figure 2.

Figure 1:
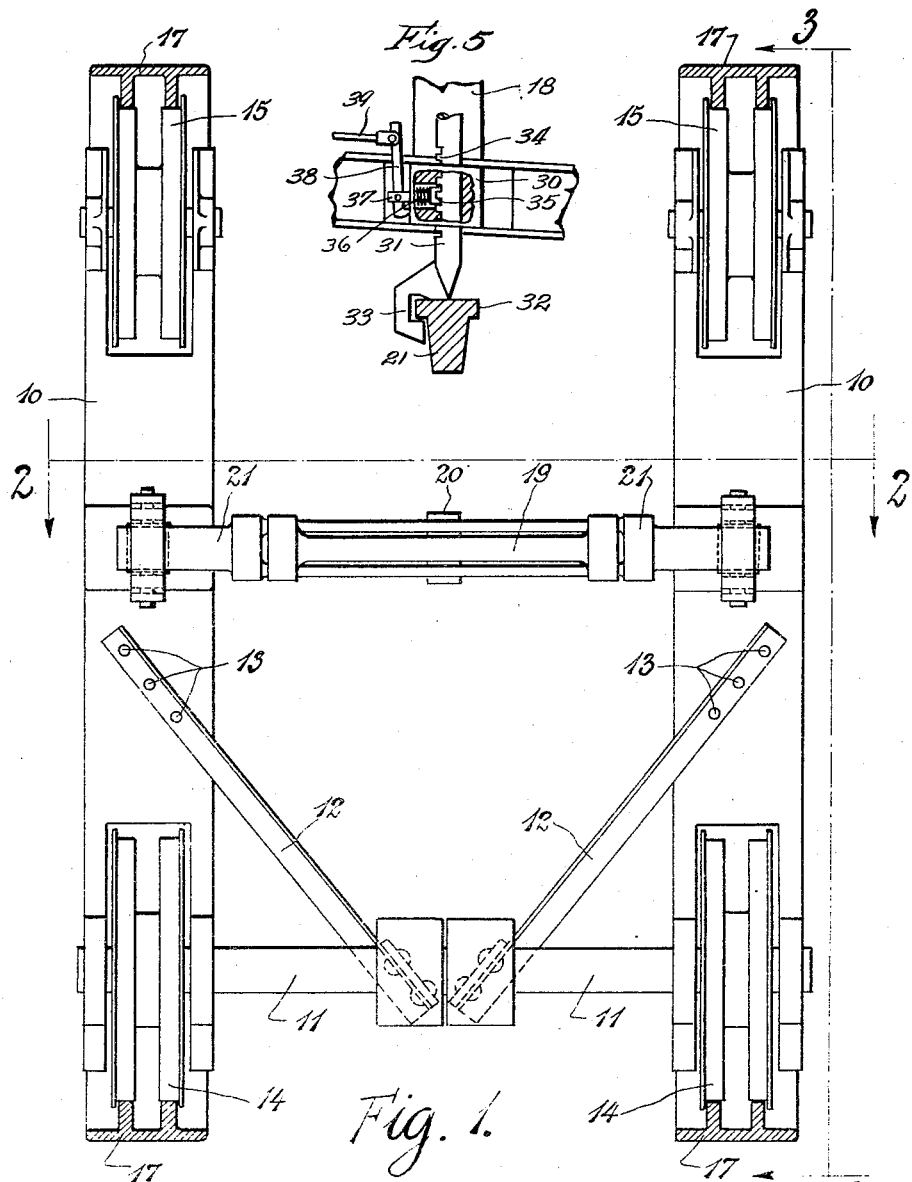
Figure 1 is a plan view of our track-frames, showing the manner in which the two track-frames are connected.
Figure 2:
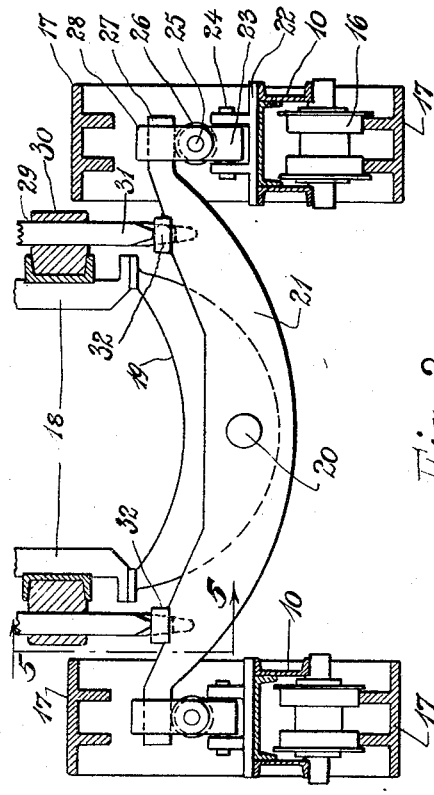
Figure 2 is a view, partly in elevation and partly in vertical section, taken as indicated by the line 2—2 in Figure 1.
Figure 3:
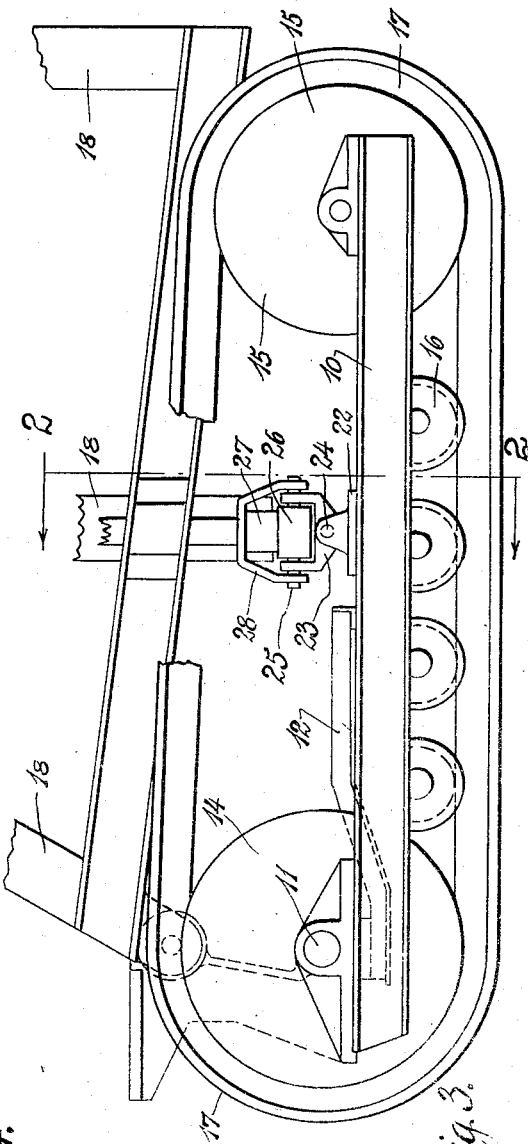
Figure 3 is a side elevation, taken as indicated by the line 3—3 in Figure 1.
Figure 4:
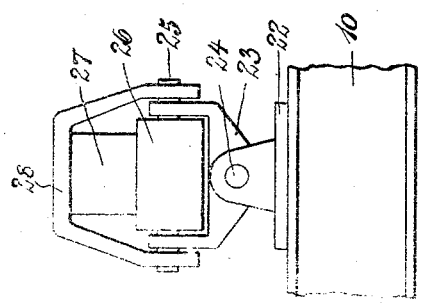
Figure 4 is an enlarged view of a part of Figure 3, showing the rolling universal-joint connection between the track-frame and the equalizing-beam.

Referring more particularly to Figure 1, the two track-frames 10 are independently rotatable about the rear axle 11. Diagonal braces 12 are independently pivoted to the rear axle adjacent its center, their other ends being bolted to the track frame as shown at 13. Journaled in the side frame (see Figure 3) are the usual rear tumbler 14 on the rear axle 11 the front tumbler 15, and a number of rollers 16. The endless tread belt 17 encircles these rollers and tumblers in the usual manner. The superstructure, part of which is shown as 18 in Figures 2 and 3, rests, in the rear, upon the rear axle 11, and at about its center, upon the bolster 19. The bolster is pivotally connected, by the pin 20 at its center, to the equalizing beam 21.

Appropriate means (not shown) are, of course, provided for driving the axle 11 from an engine (not shown) on the superstructure.

The track-frame carries adjacent its center a support-bearing 22, to which a yoke 23 is pivoted on a transverse pivot 24. The yoke 23 is thus free to rock in a longitudinal vertical plane. The yoke 23 carries a longitudinal roller-axis 25, on which is rotatably mounted the roller 26 upon which the end 27 of the equalizing-beam 21 rests. Upon the same roller-axis is also rotatably pivoted a strap 28 which extends, as shown, around the top of the end 27 of the equalizing-beam, there being only a small clearance between the strap 28 and the upper surface of the end 27 of the equalizing-beam.

The superstructure 18 carries at each side a stabilizer 29, which is more particularly shown in Figure 5, and described as follows. It consists essentially of a member 30, rigidly affixed to the superstructure 18, which member carries vertically slidable therein the rod 31. The member 30 is so positioned and arranged that the foot of the rod 31 rests upon the pad 32, which is rigidly attached to the equalizing beam 21, as shown; and hook 33 is provided for constraining each rod to be in contact with the corresponding pad at all times.

The rods 31 are left freely slidable in the members 30 when the machine is travelling, so that any relative motion between the equalizing beam 21 and the bolster 19 will cause one rod to slide up and the other to slide down.

When the machine is working in a stationary position, the rods are clamped against any such sliding, thereby stabilizing the machine and providing a rigid four-point support.

The means for this clamping are as follows, each rod 31 is provided with teeth 34. The member 30 carries a reciprocable pawl 35, and the stem of this pawl carries a spring 36, exerting pressure on the pawl in the direction of the rod 31. The teeth 34 and pawl 35 together constitute locking mechanism for holding the rod 31 against movement in its bearing 30.

The stem 37 of the pawl is secured to a short lever 38, to which is attached a rod 39 extending rearwardly to control mechanism (not shown) at the station of the driver of the tractor. Any appropriate control mechanism may be used for this purpose.

Our endless track mounting is thus seen to provide track-frames that are each independently free to rock in a vertical plane about the rear axle, but are prevented from any sidewise swing. The pivotal connection of the bolster to the center of the equalizing beam prevents such rocking of the track-frames from transferring any distortional stresses into the superstructure.

The equalizing-beam carries the load across almost exactly to the centers of the track frames. As the equalizing-beam swings in the arc of a circle, the roller accommodates the two motions: i. e., the rotation of the track-frame in a longitudinal vertical plane and the rotation of the equalizing-beam in a transverse vertical plane. The roller, mounted in the pivoted yoke, thus provides a rolling universal-joint connection between the equalizing-beam and the track-frames.

When the machine is traveling, and a track-frame rises or falls to accommodate the contour of the ground, the horizontal projection of the distance between the rear axle and the pivot of the yoke changes only very slightly. This change causes only an extremely small slipping motion, in a direction longitudinal of the track frame, between the end of the equalizing-beam and the roller.

When the machine is stationary for excavating or crane use, the stabilizers being rigidly clamped, any tendency of the machine to tip to one side, such as would be caused by a heavy "over-side" load, will cause that end of the equalizing-beam which tends to rise, to pick up the track-frame at the other side by means of the strap, and will thereby use the weight of that frame as an additional reaction against tipping.

Having now described and illustrated one form of our invention, we wish it to be understood that our invention is not to be limited to the specific form or arrangement of parts hereinbefore described, except in so far as such limitations are specified in the appended claims.

In the claims, when we refer to lengthwise translation of the end of the cross-member, we mean translation in the direction of the length of the cross-member; and, when we refer to sidewise translation of the end of the cross-member, we mean translation in a horizontal direction at right angles to the length of the cross-member.

We claim:

1. In a load-carrying traction mechanism, the combination of: a superstructure; two traction units; fixed means, carried by the superstructure, for independently pivoting each unit for motion in a longitudinal vertical plane; means to constrain each unit from diverging from the other; a cross-member centrally pivoted to the superstructure for rocking; and, joining each unit to one end of the cross-member, a universal joint, comprising a support-bearing carried by the unit, a member horizontally transversely pivoted on the support-bearing, and a roller horizontally longitudinally pivoted on said member and engaging the lower side of the end of the cross-member.

2. In a load-carrying traction mechanism, the combination of: a superstructure; two traction units; fixed means, carried by the superstructure, for independently pivoting each unit for motion in a longitudinal vertical plane; means to constrain each unit from diverging from the other; a cross-member, centrally secured to the superstructure and, joining each unit to one end of the cross-member, a universal joint, comprising a support-bearing carried by the unit, a member horizontally transversely pivoted on the support-bearing, a roller horizontally longitudinally pivoted on said member and engaging the lower side of the end of the cross-member, and means engageable with the upper side of the end of the cross-member whereby to lift the unit when the end of the cross-member up-tilts.

3. In a load-carrying traction mechanism, the combination of: a superstructure; two traction units; fixed means, carried by the superstructure, for independently pivoting each unit for motion in a longitudinal vertical plane; means to constrain each unit from diverging from the other, said means consisting of two diagonal bars, each having one end secured to one of the units, and the other end pivoted to the superstructure adjacent the center line of the superstructure; a cross-member, centrally pivoted to the superstructure for rocking; and, joining each unit to one end of the cross-member, a universal joint, said universal joint comprising a support-bearing carried by the unit, a member horizontally transversely pivoted on the support-bearing, and a roller horizontally longitudinally pivoted on said member and engaging the lower side of the end of the cross-member.

4. In a load-carrying traction mechanism, the combination of: a superstructure; two traction units; fixed means, carried by the superstructure, for independently pivoting each unit for motion in a longitudinal vertical plane; means to constrain each unit from diverging from the other, said means consisting of two diagonal bars, each having one end secured to one of the units, and the other end pivoted to the superstructure adjacent the center line of the superstructure; a cross-member, centrally secured to the superstructure; and, joining each unit to one end of the cross-member, a universal joint, said universal joint comprising a support-bearing carried by the unit, a member horizontally transversely pivoted on the support-bearing, a roller horizontally longitudinally pivoted on said member and engaging the lower side of the end of the cross-member, and means engageable with the upper side of the end of the cross-member whereby to lift the unit when the end of the cross-member up-tilts.

5. In a load-carrying traction mechanism, the combination of: a superstructure; two traction units; fixed means, carried by the superstructure, for independently pivoting each unit for motion in a longitudinal vertical plane; means to constrain each unit from diverging from the other; a rigid cross-member, centrally pivoted to the superstructure for rocking; joining each unit to one end of the cross member, a universal joint, characterized by permitting considerable lengthwise translation of the end of the cross-member relative to the unit, and some sidewise translation of the end of the cross-member relative to the unit, and by including means whereby to lift the unit when the end of the cross-member up-tilts; and means to lock the units to the superstructure against motion in a longitudinal vertical plane with respect to the superstructure.

FRANK. A. FULLER.
THOMAS A. SNYDER.